United States Patent

[11] 3,596,470

[72] Inventor Fritz Jakob
Kreis Wolfratshausen, Germany
[21] Appl. No. 767,011
[22] Filed Aug. 1, 1968
[45] Patented Aug. 3, 1971
[73] Assignee Linde A.G.
Wiesbaden, Germany
[32] Priority May 18, 1965
[33] Germany
[31] G 43 635
Continuation-in-part of application Ser. No. 550,782, May 17, 1966, now abandoned.

[54] PROCESS AND APPARATUS FOR THE LOW-TEMPERATURE SEPARATION OF A HYDROGEN-RICH GAS MIXTURE
16 Claims, 1 Drawing Fig.

[52] U.S. Cl. ..................................... 62/20, 62/17
[51] Int. Cl. ..................................... F25j 3/00, F25j 3/08
[50] Field of Search ............................ 23/198, 199; 62/17, 20; 262/374—377

[56] References Cited
UNITED STATES PATENTS
2,962,867 12/1960 Seidel .......................... 62/20
3,372,555 3/1968 Becker .......................... 62/39
3,426,543 2/1969 Becker .......................... 62/20
FOREIGN PATENTS
672,417 10/1963 Canada .......................... 62/126

Primary Examiner—Norman Yudkoff
Assistant Examiner—A. F. Purcell
Attorneys—M. Ted Raptes and John L. White ABSTRACT: In a process for the low-temperature separation of a hydrogen-rich gas mixture by scrubbing out at least a portion of the higher boiling components of the gas mixture by nitrogen in a scrubbing column, operating at about 80 to 210 atm. a., and at a temperature of about 1° to 15° C. above the freezing point of nitrogen at the pressure of the scrubbing column, several improvements in the technique employed for cooling both the nitrogen and the hydrogen-rich gas mixture to the necessarily low temperatures, wherein after the gas mixture and/or nitrogen is conveniently cooled in indirect heat exchange with vaporizing residual fluid from the scrubbing column, it is further cooled in indirect heat exchange with both residual fluid and ammonia synthesis gas withdrawn directly from the scrubbing column.

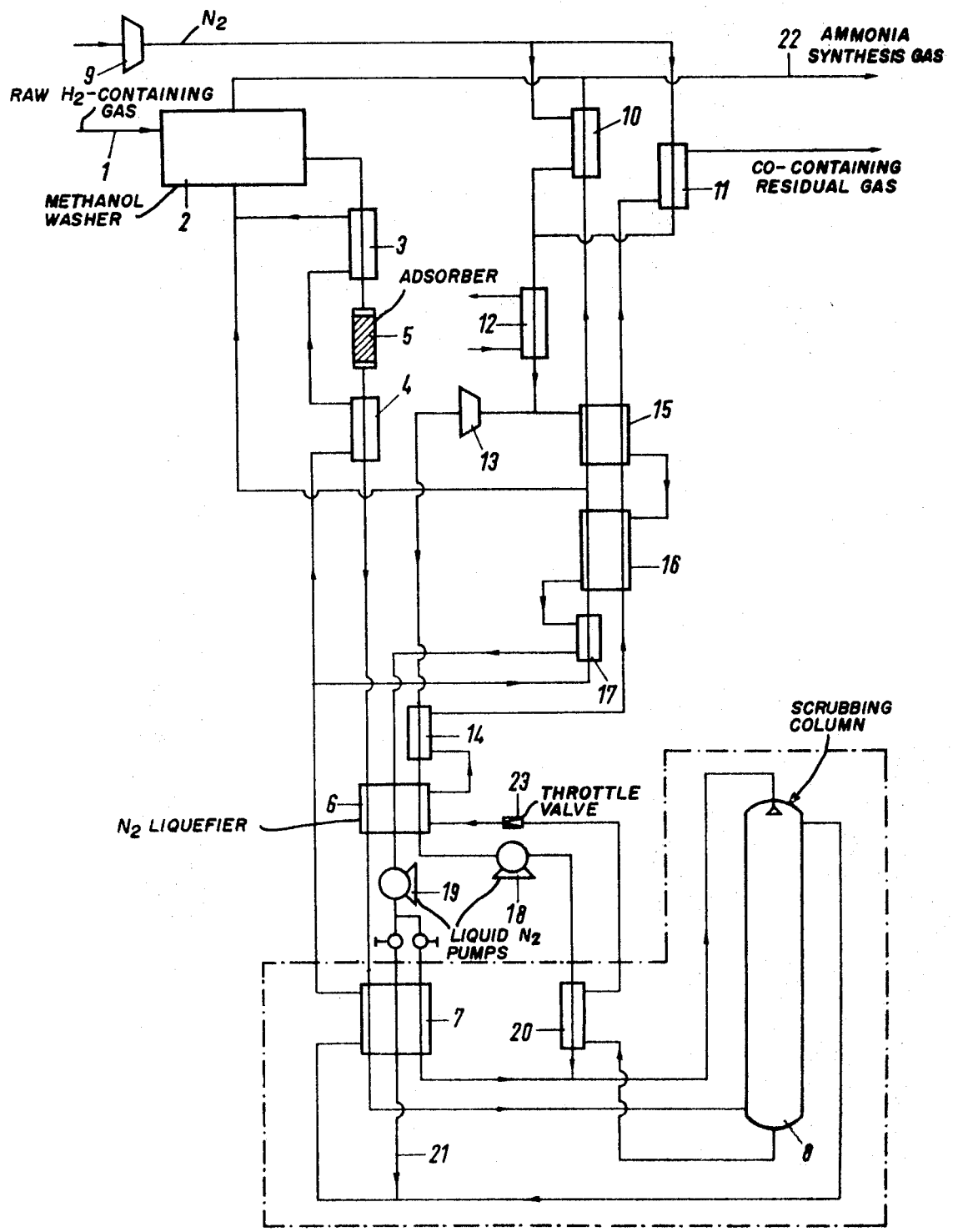

PROCESS AND APPARATUS FOR THE LOW-TEMPERATURE SEPARATION OF A HYDROGEN-RICH GAS MIXTURE

This is a continuation-in-part application of Ser. No. 550,782, filed May 17, 1966, and now abandoned and entitled PROCESS AND APPARATUS FOR THE LOW TEMPERATURE SEPARATION OF A HYDROGEN-RICH GAS MIXTURE.

This invention relates to a novel process and apparatus for the low-temperature separation of a hydrogen-rich gas mixture by scrubbing out at least a portion of the higher boiling components of the gas mixture with liquid nitrogen, this invention being particularly useful for the treatment of high-pressure conversion gas.

In general, there are several known processes which involve the scrubbing of hydrogen-rich steam with liquid nitrogen at intermediate pressures of about 5 to 40 atmospheres (absolute). The hydrogen-rich gas mixture and the high-pressure nitrogen (after cooling and expansion) are fed to the scrubbing column at such intermediate pressures. The entrance temperature of the gas mixture into the scrubbing column in the known processes is about 82°—87° K.

The development of high-pressure gasification processes makes available hydrogen-rich gas mixtures, i.e. containing at least about 40 molar percent $H_2$, particularly conversion gas, at high pressures, i.e. about 70 to 220 atmospheres absolute. Since the hydrogen-nitrogen mixture to be withdrawn from the scrubbing column during the low-temperature separation of such gases is mainly employed for the ammonia synthesis, where high pressures of about 150 to 400 atmospheres absolute are normally required, it would be extremely advantageous if the hydrogen-rich gas mixture available at high pressure could be scrubbed at high pressures and low temperatures, in order to withdraw the hydrogen-nitrogen mixture from the scrubbing column at high pressure, and to be able to feed this mixture, with little if any additional compression, to the ammonia synthesis.

The prior art, however, has definitely stated that upper limit for operating the scrubber column is 1,600 p.s.i.a. (109 atm. a.) this being set forth in U.S. Pat. No. 3,187,485, column 2, lines 5 and 6. The reason given for this upper limit is that the volatility of nitrogen and carbon monoxide is approximately equal at 1,600 p.s.i.a.

In addition, when operating at higher pressures, a substantially larger quantity of hydrogen dissolves in the liquid residue collecting in the bottom of the scrubbing column, whereby a very considerable loss of hydrogen is encountered. This occurs because at high pressures, the solubility of hydrogen in liquid $N_2$-CO is substantially increased.

A principal object of this invention, therefore, is to provide a process and apparatus for the low-temperature, high-pressure separation of a hydrogen-rich gas mixture wherein there are avoided excessive losses of hydrogen caused by the dissolution of hydrogen in the liquid residue.

Another object is to provide a scrubbing operation at even higher pressures than heretofore thought feasible.

Upon further study of the specification and claims, other objects and advantages of the present invention will become apparent.

To attain the objectives of this invention, the gas mixture and the nitrogen are cooled to a temperature close to the freezing point of the nitrogen before introduction into the scrubbing column. The $N_2$ freezing temperature will vary, according to the conditions employed, in the range of about −210° to −203°, preferably −207° to −204° C. The $H_2$ gas mixture and nitrogen are cooled to about 1° to 15°, preferably 2° to 5° C. above the $N_2$ freezing point, resulting in absolute temperatures of −209° to −188°, preferably −205° to −199° C.

In case it is necessary to reach a very high yield of hydrogen, it is possible to cool the $H_2$ mixture some centigrades below the nitrogen freezing temperature, since the freezing temperature of the nitrogen inside the scrubber is materially reduced by dissolved hydrogen.

This means that the scrubbing temperature, according to this invention, is substantially decreased, and from this fact result important advantages. On the one hand, the solubility of the hydrogen in the residual liquid is decreased, and on the other hand, the amount of scrubbing nitrogen is reduced.

The reduction in the necessary quantity of scrubbing nitrogen stems from the fact that, because of the low temperature, additional condensation of undesired components of the hydrogen gas mixture takes place before entering the scrubbing column; consequently less nitrogen evaporates in the scrubbing column. Since this evaporation occurs only a few plates above the sump of the column the amount of vapor rising in the column decreases with decreasing evaporation, whereby less liquid is necessary. Consequently, there is less sump liquid, or liquefied residual gas, available to dissolve the hydrogen, thus amounting to a bootstrap added reduction in hydrogen losses.

This invention is particularly applicable to the treatment of conversion gases or "shift" gases particularly resulting from partial oxidation processes performed at high pressures which generally have the following range of composition:

| Component | Molar %<br>Before Preliminary<br>Purification | Molar %<br>Range to<br>Scrubbing Column |
| --- | --- | --- |
| $H_2$ | 60.9 | 90—98 |
| CO | 4.0 | 3—8 |
| $CO_2$ | 33.0 | — |
| $CH_4$ | 1.3 | 0.1 |
| $N_2$ | 0.1 | 0.1 |
| Ar | 0.3 | 0.1 |
| $H_2S$ | 0.4 | — |

Since the parts of the apparatus having a temperature below the liquefaction temperature of the nitrogen must be provided each in a separate jacket, or all together in a single cold box in a hydrogen or hydrogen-nitrogen atmosphere, i.e. a gas having a condensation temperature below that of the freezing point of nitrogen, these jackets, or this box, would have to be penetrated to connect the regulating elements and pumps. Therefore, according to one embodiment of the inventive idea, the required regulating elements and pumps are provided only outside the zone of the lowest temperature in the plant.

According to a further embodiment of the invention, the gas mixture and the nitrogen are cooled to temperatures close to the freezing point of the nitrogen by (1) hydrogen-nitrogen mixture withdrawn from the top of the scrubbing column and (2) by residual liquid from the bottom of the scrubbing column.

The residual liquid is preferably vaporized in a vaporizing vessel, and individual heat exchangers are connected thereafter. In this connection, the scrubbing temperature can be correspondingly stabilized by conventional flow and temperature controllers, or by constructing the vaporizing vessel as a vacuum evaporation vessel; this must be done since the scrubbing temperature cannot be reduced arbitrarily because of the danger of solid deposits.

The attached drawing is a schematic flowsheet of the preferred embodiment of this invention, but is not intended to be limitative of the appended claims in the light of the entire description of this invention.

Conversion gas to be treated in the illustrated system is fed under a pressure of 150 atmospheres absolute through conduit 1. In methanol washer 2, not illustrated in detail, the easily condensable components are washed out of the conversion gas and, between a cooling step in the heat exchanger 3 and a cooling step in the heat exchanger 4, the last traces of $CO_2$ are removed in the adsorber 5. The resultant gas has a composition of:

| | | | |
|---|---|---|---|
| H₂ | 91.3 Mol % | N₂ | 0.2 Mol % |
| CO | 6 Mol % | Ar | 0.5 Mol % |
| CH₄ | 2 Mol % | CO₂ and H₂S traces | |

In the vaporizing vessel 6 (where the residual liquid is vaporized) and in the following heat exchanger 7, the conversion gas is then cooled to about −203° C., near the freezing point of nitrogen. The conversion gas which has thus been cooled to such a low temperature is thereafter fed to the bottom of the scrubbing column 8 and rises therein upwardly in countercurrent relationship to liquid high-pressure nitrogen, the pressure in the scrubbing column being about 149 atmospheres absolute.

The nitrogen, supplied to the plant directly, for example, from an air separation plant, is compressed to a pressure of 100 atmospheres absolute in the turbocompressor 9, the pressure thus achieved being below the pressure of the conversion gas, and is then conducted, in portions, through the heat exchangers 10 and 11 where it is cooled countercurrently to hydrogen-nitrogen mixture or to gaseous residual liquid.

The entire amount of nitrogen is then again cooled by an external cooling system, for example, with ammonia, in the heat exchanger 12. Subsequently, a portion is machine expanded, with the production of external work, in the turbine 13, to a low pressure, for example, to 3 atmospheres absolute; then, this portion is cooled in the heat exchanger 14 by gaseous residual liquid. The other portion, about 70 to 90 percent, is conducted through the countercurrent heat exchangers 15, 16, and 17. In the vaporizing vessel 6, expanded residual liquid evaporates, while simultaneously cooling: (a) the conversion gas, (b) the nitrogen portion condensing at low pressure, and (c) the nitrogen portion in the supercritical state. Both nitrogen portions are then compressed in the liquid pumps 18 and 19 to the pressure of the conversion gas. The nitrogen is cooled to −200° C., the temperature close to its freezing point, in the heat exchangers 7 and 20 by hydrogen-nitrogen mixture and residual liquid. A portion of the thus-cooled nitrogen can be admixed, via conduit 21, to the hydrogen-nitrogen mixture leaving the head of the scrubbing column 8, in order to obtain the stoichiometric quantities for the ammonia synthesis. The remainder of the nitrogen is fed to the head of the scrubbing column 8.

A portion of the nitrogen evaporates on the first plates above the sump of the column 8. The remainder collects, in the liquid phase, in the sump, together with the scrubbed-out components of the conversion gas, particularly CO and CH₄. Evaporation brings about a decrease in the temperature of the scrubbing column 8, which facilitates the heat exchange in the heat exchangers 7 and 20. The amount of nitrogen which evaporates is smaller than in the known processes, owing to the low temperature of the nitrogen, whereby less vapor rises in the column 8. Correspondingly, a smaller reflux is used which, in turn, results in a smaller amount of residual liquid, and that, in turn, results in less dissolved hydrogen.

The low scrubbing temperature additionally effects a decrease in the solubility of hydrogen in the residual liquid comprising N₂-H₂-CO.

The resultant hydrogen-nitrogen mixture, after adjusting the proportions necessary for the ammonia synthesis, vii conduit 21 is warmed, in the heat exchanger 7, and is then divided. One partial stream of about 60 to 75 percent cools the conversion gas in the heat exchangers 4 and 3 and in the methanol washer 2, whereas the other partial stream cools the high-pressure nitrogen in the heat exchangers 7, 16, 15, and 10, as well as the conversion gas in the methanol washer. The entire hydrogen-nitrogen mixture is withdrawn from the plant via conduit 22 and fed to the ammonia synthesis.

The supercooled, residual liquid withdrawn from the sump of the scrubbing column 8—essentially nitrogen, carbon monoxide, and methane—is warmed in the heat exchanger 20, is then pressure reduced in throttle valve 23, vaporized in the heat exchanger 6, and warmed to ambient temperature in the heat exchangers 14, 16, 15 and 11, whereupon it is withdrawn from the plant.

From the above-described specific example, it is seen that hydrogen-rich gases are scrubbed with nitrogen at pressures greatly in excess of those heretofore thought feasible. Although, in the illustrated embodiment, the scrubbing is conducted at approximately 150 atm. a., it is contemplated that the scrubbing thereof may be successfully accomplished at any pressure within the above-described high-pressure range. It is therefore within the scope of the invention, and also a novel aspect thereof, to conduct the scrubbing step of this process at above 109 atm. a., advantageously at pressures of at least 113 atm. a., and even more advantageously at least 120 atm. a.

The dot-dash line in the drawing embraces the zone of the lowest temperature in the plant. The parts of the apparatus encompassed thereby are each surrounded by a jacket having a hydrogen-nitrogen atmosphere. The regulating elements and pumps all are outside of the zone of lowest temperature. The jackets of the individual parts of the apparatus thus do not have to be pierced for the regulating elements and pumps. However, it is likewise possible to provide a single jacket with a hydrogen-nitrogen, or hydrogen atmosphere around all apparatuses.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What I claim is:

1. In a process for the low-temperature separation of a hydrogen-rich gas mixture by scrubbing out at least a portion of the higher boiling components of the gas mixture by nitrogen in a scrubbing column, the improvement comprising cooling the gas mixture and the nitrogen to a temperature 1°—15° C. above the freezing point of said nitrogen before introduction into the scrubbing column, and operating the scrubbing column at above 1,600 p.s.i.a. to about 210 atmospheres absolute.

2. A process as defined by claim 1 wherein said temperature is 2°—5° C. above the freezing point of the nitrogen.

3. A process as defined by claim 1 wherein said nitrogen, before entering the scrubbing column, is branched, one portion being expanded with the production of external work, further cooled and liquified by indirect heat exchange with vaporizing residual fluid from the bottom of the scrubbing column, and the other portion being cooled by indirect heat exchange relationship with hydrogen-nitrogen mixture from the top of the scrubbing column, and further cooled by indirect heat exchange relationship with residual fluid from the bottom of the scrubbing column.

4. An apparatus for producing a nitrogen-scrubbed hydrogen stream, said apparatus comprising: a vaporizing vessel (6); a heat exchanger (7); a scrubbing column (8); a pump (18); a pump (19); a heat exchanger (20); and a throttle valve (23); said vaporizing vessel being connected by first conduit means, via said heat exchanger (7), with the bottom of the scrubbing column; said vaporizing vessel being also connected by second conduit means having said pump (19) therein, via said heat exchanger (7) with the head of said scrubbing column, and also with a conduit branched from said second conduit means coming from the head of the scrubbing column; said vaporizing vessel being also connected by third conduit means, via said pump (18) and said heat exchanger (20), likewise with the head of the scrubbing column; said vaporizing vessel being also connected by fourth conduit means, via said throttle valve (23) and said heat exchanger (20), with the bottom of the scrubbing column.

5. An apparatus as defined by claim 4 wherein said heat exchanger (7), said heat exchanger (20), and said scrubbing column (8) are insulated such that they are not associated with regulating elements and pumps, so as to avoid penetration of said insulation.

6. An apparatus as defined by claim 5 wherein within said insulation and surrounding said heat exchangers and scrubbing column is a gas having a condensation temperature below the freezing point of nitrogen.

7. In a process for the low temperature separation of a hydrogen-rich gas mixture by scrubbing out at least a portion of the higher boiling components of the gas mixture by nitrogen in a scrubbing column, the improvement comprising withdrawing residual fluid from the bottom of the scrubbing column and passing said residual fluid at the pressure at which it is withdrawn first in indirect heat exchange relationship with liquid nitrogen pressure-reducing resultant warmed residual fluid, and then passing and vaporizing resultant pressure-reduced residual fluid in indirect heat exchange with nitrogen and said hydrogen-rich gas mixture.

8. A process as defined by claim 7 wherein cold hydrogen-nitrogen mixture is withdrawn from the top of the scrubbing column and passed in indirect heat exchange with said nitrogen and said hydrogen-rich gas mixture just cooled from said indirect heat exchange with said vaporizing resultant pressure-reduced residual fluid.

9. A process as defined by claim 7 wherein said scrubbing column is operated at 80—210 atmospheres.

10. A process as defined by claim 8 wherein said scrubbing column is operated at 80—210 atmospheres.

11. In a process for the low-temperature separation of a hydrogen-rich gas mixture by scrubbing out at least a portion of the higher boiling components of the gas mixture by nitrogen in a scrubbing column, the improvement comprising passing said gas mixture at 80—210 atmospheres absolute in separate successive steps in heat exchange relationship with a portion of hydrogen-nitrogen mixture from the top of the scrubbing column, with residual fluid from the bottom of the scrubbing column, and all of said hydrogen-nitrogen mixture.

12. In a process for the low-temperature separation of a hydrogen-rich gas mixture by scrubbing out at least a portion of the higher boiling components of the gas mixture by nitrogen in a scrubbing column operating at 80—210 atmospheres, comprising branching said nitrogen before entering the scrubbing column, one portion being expanded with the production of external work, further cooled and liquefied by indirect heat exchange with vaporizing residual fluid from the bottom of the scrubbing column, and the other portion being cooled by indirect heat exchange relationship with hydrogen-nitrogen mixture from the top of the scrubbing column, and further cooled by indirect heat exchange relationship with residual fluid from the bottom of the scrubbing column.

13. A process as defined by claim 12 wherein said other portion comprises 70—90 percent of said nitrogen.

14. A process as defined by claim 1 wherein the hydrogen-rich gas mixture fed to the scrubbing column contains on a molar basis, about 90—98 percent hydrogen, 3—8 percent carbon monoxide, 0.1 percent methane, 0.1 percent nitrogen, and 0.1 percent argon.

15. A process as defined by claim 1 wherein the scrubbing column is operated at above 113 atmospheres absolute.

16. A process as defined by claim 1 wherein said scrubbing column is operated at above 120 atmospheres absolute.